June 30, 1964  R. J. SHAFRANEK ETAL  3,139,547
ROTARY DIGITAL ACTUATOR
Filed June 30, 1961  3 Sheets-Sheet 1
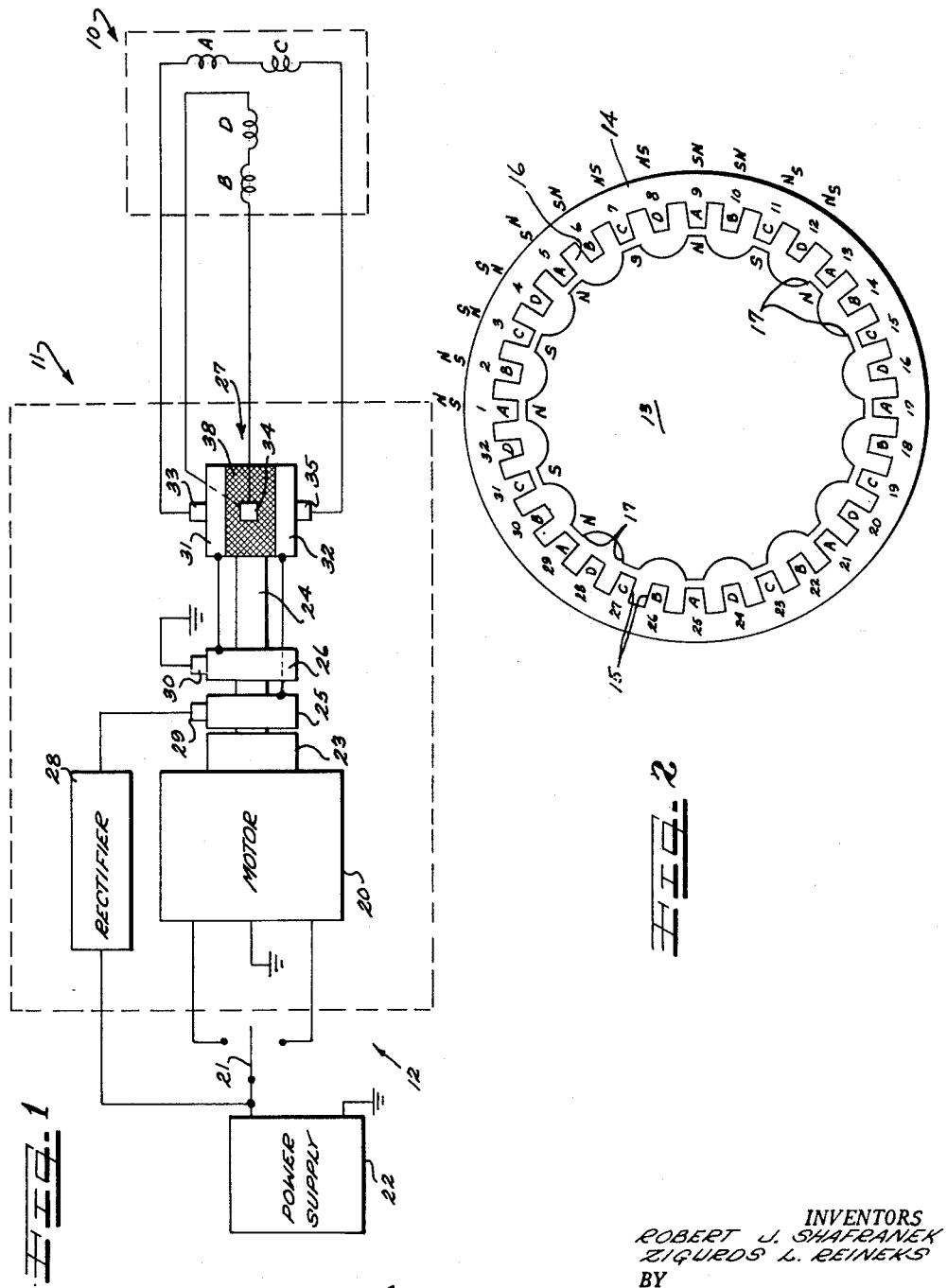
INVENTORS
ROBERT J. SHAFRANEK
ZIGURDS L. REINEKS
BY
Hill, Sherman, Meroni, Gross & Simpson
ATTORNEYS June 30, 1964  R. J. SHAFRANEK ETAL  3,139,547
ROTARY DIGITAL ACTUATOR
Filed June 30, 1961
3 Sheets-Sheet 2

INVENTORS
ROBERT J. SHAFRANEK
ZIGURDS L. REINEKS
BY
Hill, Sherman, Meroni, Gross & Simpson
ATTORNEYS

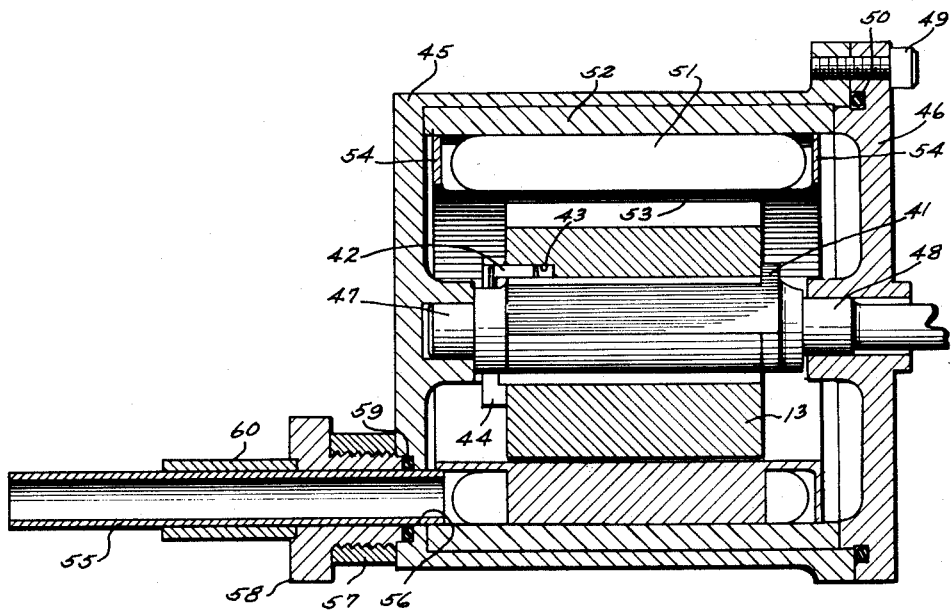
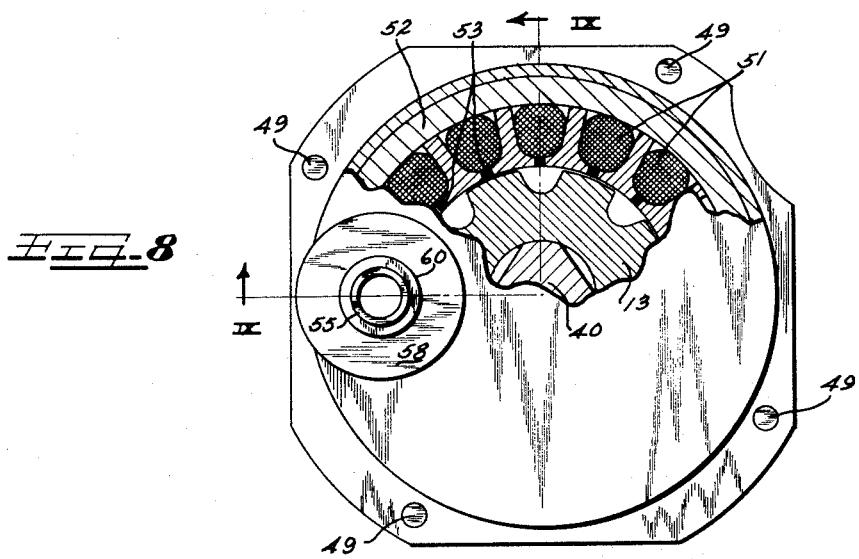

United States Patent Office 3,139,547
Patented June 30, 1964

1

3,139,547
ROTARY DIGITAL ACTUATOR
Robert J. Shafranek, Kent, and Zigurds L. Reineks, Cleveland, Ohio, assignors to Thompson Ramo Wooldridge Inc., Cleveland, Ohio, a corporation of Ohio
Filed June 30, 1961, Ser. No. 121,207
8 Claims. (Cl. 310—46)

This invention relates to rotary actuators and, more particularly, to a slow speed, constant torque rotary digital actuator that can operate from either alternating or direct current under relatively high pressures and temperatures.

Slow speed rotary positioning devices or actuators of the type constructed in accordance with this invention can be used as a drive mechanism in nuclear reactor manipulation systems, as a paddle axis drive mechanism on satellites, as a fuel adjustment on air borne fuel control systems for gas turbine engines, etc. Actuators now in general use for these and analogous purposes are usually constructed as electric motors with means to gear down the speed of the motor. For example, high speed geared down synchronous motor actuators are presently used for trimming of the fuel adjustment of air borne gas turbine engines.

High speed motors with gear boxes have several disadvantages in this type of application, which are mainly due to the relatively large number of moving parts inherent in such a device and the relatively close tolerances required. In cases where a synchronous motor is immersed in the fuel when it is used in a fuel control system, the motor cannot be used without filters to filter out contaminates in the jet fuel which is circulated through the motor. Other types of conventional actuators have similar disadvantages in this and other applications and, additionally, they are relatively expensive and not as rugged or dependable as is desired in most applications.

Accordingly, it is a general object of this invention to provide an improved rotary actuator which is so constructed and has such characteristics that the limitations inherent in actuators heretofore used for the same general purposes are eliminated or minimized.

It is another object of this invention to provide a rotary actuator which is simple and rugged and which has a minimum number of moving parts.

It is an other object of this invention to provide a rotary actuator which operates at relatively slow speed and produces constant torque.

It is still another object of this invention to provide a rotary digital actuator which rotates in steps and automatically locks in each position with all electrical power either on or off.

It is still another object of this invention to provide a rotary actuator which is constructed to withstand relatively high pressures and temperatures.

It is still another object of this invention to provide a rotary digital actuator for remote trimming of a fuel adjustment on an air borne fuel control system on a gas turbine engine which, due to its simplicity, slow speed and tolerances, can be put directly in the fuel without the use of filters for contaminated jet fuel.

These and other objects of the invention are attained by providing an actuator that includes a rotor and a stator mounted adjacent to the rotor and separated therefrom by an air gap. The rotor has a plurality of poles which are permanently magnetized in radial directions with opposite magnetic poles appearing adjacent each other. The stator also has a plurality of poles which face the rotor poles, and the distance between adjacent stator poles is substantially one half the distance between adjacent rotor poles. A plurality of electrical windings are wound around the stator poles and a control means is provided to supply energy to these stator windings. The control means provides direct current to the stator windings in such a manner that a rotating magnetic field is obtained which attracts the magnetic poles of the rotor. Through the control means, the rotating magnetic field can be made to travel in either a clockwise or a counter-clockwise direction, or the rotor can be held stationary by de-energizing the control means. The rotor of the actuator travels in distinct steps and it locks in position at each step whether the electrical power is on or off.

This invention may be better understood and other objects, features and advantages more apparent from the following detailed description taken in conjunction with the accompanying figures of the drawings, wherein like reference numerals refer to like parts, in which:

FIGURE 1 is a schematic illustration of a rotary digital actuator and control mechanism constructed in accordance with the invention;

FIGURE 2 is an illustration of the rotor and the stator for an actuator constructed in accordance with the invention;

FIGURE 8 is a view partly in section showing the construction of an embodiment of the invention; and FIGURE 9 is a sectional view taken along the line IX—IX of FIGURE 8.

As shown on the drawings:

Figure 3:
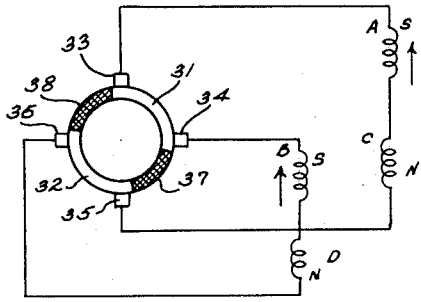
FIGURES 3–7 are schematic electrical diagrams which illustrate the operation of the actuator.

The apparatus illustrated in FIGURE 1 includes a rotary actuator 10, a control mechanism 11, and a manual control 12.

The rotary actuator 10 includes four coil groups A, B, C and D, a rotor 13, FIGURE 2, and a stator 14. The coil groups A and C are connected in series but are oppositely wound, and the coil groups B and D are connected in series and oppositely wound. These four coil groups are wound around a plurality of inwardly extending poles 15 formed on the stator 14.

With specific reference to FIGURE 2, the rotor 13 is rotatably mounted in a manner to be described hereinafter within the fixed stator 14. This rotor 13 is a star-shaped multipole permanent magnet which is radially magnetized with opposite magnetic poles appearing on adjacent prongs of the star. In the embodiment illustrated, there are sixteen poles 17 on the rotor.

The stator 14 has twice as many, or thirty two, poles 15 and slots 16 as there are poles 17 formed on the rotor. The coil groups A–D are wound around the stator poles 15 through the slots 16 in the following order: Windings forming part of the coil group A are wound around the number one pole 15, windings forming part of the coil group B are wound around the next adjacent pole number two, windings forming part of the coil group C are wound around the third pole number three, and windings forming part of the coil group D are wound around the fourth pole number four. This procedure is repeated for the next poles keeping the order of the windings running consecutively around the stator as illustrated in FIGURE 2.

Assume that at the starting position illustrated in FIG-

URE 2 the coil groups A and C are energized and the direction of current flow through these windings is such that all of the poles one, five, nine, etc. form south magnetic poles and all of the poles three, seven, eleven, etc. form north magnetic poles; further assume that the coil groups B and D are energized in such a manner that all of the poles two, six, ten, etc. form south magnetic poles and all of the poles four, eight, twelve, etc. form north magnetic poles. The rotor 13 will remain stationary due to the attraction of its magnetic poles to the opposite polarity magnetic poles adjacent them on the stator 14.

Then, if the direction of current flow through the coil groups A and C is reversed, the stator poles one, five, etc. will be north magnetic poles and the stator poles three, seven, etc. will be south magnetic poles. Since the rotor poles 17 are then adjacent magnetic poles of like polarity, the rotor 13 will move angularly the distance equal to the space between adjacent stator poles. It will move to the next pole due to the attraction of the next adjacent opposite polartity magnetic pole and the repulsion of the adjacent like polarity magnetic pole. Further, it will move in the clockwise direction because the stator poles adjacent the rotor poles to the right are of opposite polarity while those to the left are of like polarity.

Then, if the direction of current through the coil groups B and D is also reversed making the stator poles two, six, etc. north magnetic poles and the stator poles four, eight, etc. south magnetic poles, the rotor 13 will again rotate in the clockwise direction $\frac{1}{32}$ of a complete revolution due to the concurrent repulsion and attraction of the poles.

If the direction of current flow through the coil groups A and C is once again reversed returning the poles to their former polarities, the rotor 13 will again rotate $\frac{1}{32}$ of a complete revolution. It is apparent that if this procedure is continued in this order the rotor 13 will continue to rotate in the clockwise direction as seen in FIGURE 2 making 32 steps in each complete revolution.

To reverse the direction of rotation of the rotor 13, assume that the coil groups A–D are again initially energized in such a manner that all of the poles A and B form south magnetic poles and all of the poles C and D form north magnetic poles. First, the direction of current flow through the coil group B and D is reversed which makes all of the poles B north magnetic poles and all of the poles D south magnetic poles. Then, the direction of current flow through the coil groups A and C is reversed which makes all of the poles A north magnetic poles and all of the poles C south magnetic poles. The rotor 13, therefore, will be forced to rotate in the counterclockwise direction as seen in FIGURE 2 since each pole on the rotor is adjacent a like polarity pole on the stator and the next adjacent pole on the stator in the clockwise direction is also of a like polarity while those in the counterclockwise direction are of opposite polarity. It can again be seen that the rotor 13 will continue to rotate, this time in a counterclockwise direction, as the direction of current flow in the four coil groups is reversed.

The rate of rotation of the rotor 13, of course, depends on the rate at which the currents are reversed. The control mechanism 11, FIGURE 1, accomplishes this function by providing a series of direct current pulses in opposite directions to the four coil groups. This mechanism 11 includes a reversible synchronous timer motor 20 that is energized through a single-pole double-throw center-off switch 21 by an alternating current power supply 22. When the switch 21 is at the upper position the motor 20 will be energized in a first or forward direction and when the switch 21 is in the lower position the motor will be energized in a second or reverse direction. When the switch 21 is in the center position the motor 20 will be unenergized and at a standstill. The motor 20 may be a two phase design with a phase shift network that is switched between windings by the switch 21.

The output of the motor 20 is connected through a speed reduction gear box 23 to a drive shaft 24. Two slip rings 25 and 26 and a two segment communtator 27 are fixed to the shaft 24. The first slip ring 25 is connected through a rectifier 28 and a brush 29 to the output of the AC power supply 22, and the second slip ring 26 is connected to the common ground potential through a brush 30.

The two slip rings 25 and 26 are electrically connected to the two segments 31 and 32 of the commutator 27. The segment 31 is connected to the slip ring 26 and ground potential and the segment 32 is connected to the slip ring 25 and the direct current output of the rectifier 28. The commutator 27 also includes two unenergized sections 37 and 38 which support the segments 31 and 32 and keep them electrically insulated from each other.

Four brushes 33–36 are mounted in contact with the commutator 27 in each of the four quadrants. The brushes 33 and 35 are electrically connected across the two coil groups A and C and the two brushes 34 and 36 are electrically connected across the two coil groups B and D.

Figure 4:
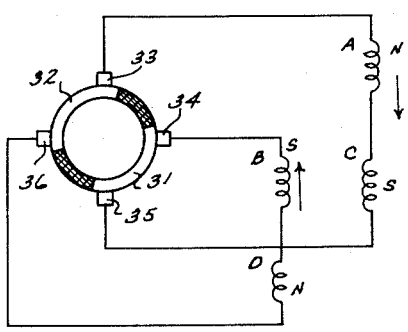
Figure 5:
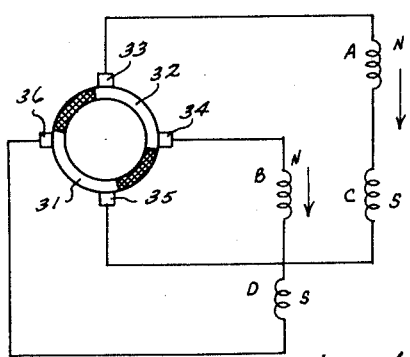
Figure 6:
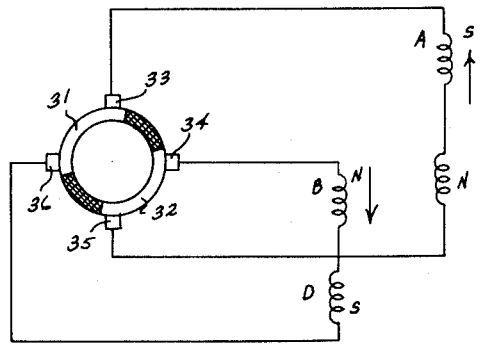
Figure 7:
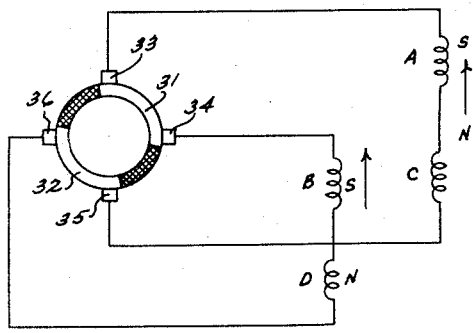

It will be recalled that the segment 31 is connected to ground potential and the segment 32 is at a positive potential relative to the segment 31 due to the connection to the rectifier 28. With specific reference to FIGURE 3, current will flow from the brushes 35 and 36, through the coil groups A–D, and to the brushes 33 and 34. The coil groups A and B are wound in such a manner that they make their stator poles south magnetic poles and the coil groups C and D are wound to make their poles north magnetic poles. This is the initial starting position described relative to FIGURE 2. When the motor 20 rotates the commutator 27 relative to the brushes approximately one quarter of a revolution as shown in FIGURE 4, the segment 31 will contact the two brushes 34 and 35 and the segment 32 will contact the brushes 33 and 36. Current continues to flow in the same direction through the coil group B and D but it reverses its direction through the two coil groups A and C. This causes the rotor 13 to rotate $\frac{1}{32}$ of a revolution in the clockwise direction. With reference to FIGURE 5, the commutator 27 has again turned approximately one quarter of a revolution and the direction of current flow through the four coil groups A–D is reversed relative to the direction illustrated in FIGURE 3. This again causes the rotor 13 to rotate in the manner previously described. In FIGURE 6, the commutator 27 has been rotated another quarter of a revolution causing the current flow in the coil groups A and C to reverse relative to the direction illustrated in FIGURE 5 and the rotor 13 again rotates. In FIGURE 7, the commutator 27 has returned to the position illustrated in FIGURE 3 and the cycle is completed. By continuing the rotation of the commutator 27 in this manner the rotor 13 is caused to rotate about its axis in a series of steps.

It is apparent that for one complete revolution of the commutator 27 the rotor 13 rotates $\frac{4}{32}$ of a revolution. Therefore, for every eight complete turns of the commutator the rotor 13 will make one complete revolution. It is also apparent that if the speed of the motor 20 is geared down until the shaft 24 speed is eight revolutions per minute, the speed of the rotor 13 will be one revolution per minute. Of course, if the rate of rotation of the motor 20 is increased, the rate of rotation of the rotor 13 will increase accordingly; also, by changing the number of poles on the rotor 13 and the stator 14 the ratio of the rotor 13 revolutions to the commutator 27 revolutions can also be changed.

The rotor 13 and stator 14 structure for the actuator 10 is illustrated in FIGURES 8 and 9. In the embodiment of the invention illustrated in FIGURES 8 and 9, the rotor has eight poles and the stator has 16 poles.

The rotor 13 is generally cylindrical and is mounted on a shaft 40. It is held in place on the shaft 40 on one end by a shoulder 41 and at the other end by a key 42 that fits in a keyway 43, and a holder 44.

The rotor 13 is rotatably mounted in a frame 45 that has one open end which is closed by a bracket 46. The shaft 40 is journaled at one end 47 in the frame 45 and at its opposite end 48 in the bracket 46. A plurality of bolts 49 extend through holes formed in the bracket 46 and thread into the frame 45, and a circular seal 50 between the frame 45 and the bracket 46 makes the coupling liquid tight.

The stator 14 is preferably formed by placing prewound toroidal coils 51 in the slots 16 from the outer periphery of the stator. The space between the stator poles at the rotor bore are first filled with nonmagnetic weld to form spacers 53 which give a high pressure seal and a solid ring construction. A magnetic ring 52 is then slipped over the top of the stator and the coils and shrunk in place in order to complete the magnetic circuit. The compartments formed by the stator slots for the coils are made air and liquid tight by welding the end members 54 of the stator poles to the ring 52 and to the nonmagnetic spacers 53.

The electrical connections between the brushes 33–36 and the four coil groups is made through a tube 55 that leads through a hole 56 formed in the frame 45. The tube 55 is welded at its inner end to the pole end members 54 so that the coil compartments are kept air and liquid tight. An internally threaded boss 57 is welded to the outside of the frame 45 and receives a sealer screw 58 and a circular ring seal 59. A sleeve 60 is also welded to the tube 55 and to the top of the sealer screw 58 and, along with the seal 59, ensures liquid tight connection even under very high pressures.

In the event the actuator is to be operated in a very high temperature environment, it may be desirable to pass a cooling fluid through the device. This may be the fuel itself when the mechanism is being used with a fuel adjustment. This can be accomplished by forming a hole in the frame 45 leading to the rotor cavity and fastening a fluid coupling to it and leaving sufficient clearance between the shaft 40 and the bracket 46 at the point 48 so that the fluid can flow between these two members. The cooling fluid is then able to flow through the rotor bore between these two outlets.

The end of the shaft at 48 can be directly coupled to a device to be adjusted or it can be connected to such a device through any conventional gears or linkages.

It is apparent that a very simple and effective rotary digital actuator and a control mechanism have been provided. The device can be operated from either a D.C. or an A.C. power supply or both. In the event a D.C. power supply is being used the motor 20 will have to be of a type other than a synchronous motor, of course, and the rectifier 28 can be dispensed with. The rectifier 28 can be a fullwave silicon diode rectifier or any other conventional type. The commutator 27 and the brushes 33–36 can also be conventional types, the only requirement being that the unenergized sections 37 and 38 of the commutator be slightly larger than the width of the brushes 33–36 so that the brushes will not short out the power supply by being in contact with the two energized segments 31 and 32 simultaneously.

It should be apparent that instead of having a dynamic control mechanism of the type illustrated, a static control mechanism could also be provided which may consist of electronic switching circuitry, which could switch the polarity of the applied D.C. power in a predetermined sequence to coil groups A–D.

In the event the actuator is to be used to control the position of a device that should not be turned beyond a predetermined range, conventional mechanical stop members can be coupled to either the actuator 10 or to the control mechanism 11, or both, to limit the rotational movement of these elements to a certain number of turns within a desired range.

The actuator disclosed has a further advantage which is inherent in its design. When the switch 21 is turned to one of its two positions so that the commutator segments 31 and 32 are energized, the rotor 13 will be held fixed until the direction of current flow through the coil groups is changed. Further, in the event of failure of all of the electrical power the rotor will remain in the position obtaining prior to the power failure which is the position where the rotor poles are in line with the stator poles. The permanent magnet rotor will resist rotational motion in either direction in a manner similar to a spring loaded detent. In other words, the rotor magnetically locks in position with electrical power either on or off because the permanent magnet rotor opposes variations in the reluctance of the magnetic circuit.

The actuator has further advantages resulting from the fact that it has only one moving part, the rotor, and because it moves at a relatively slow speed. Therefore, the bearings for the rotor shaft can be made very simple and the tolerences do not have to be close. This results in a very rugged structure and permits contaminated jet fuel, where the actuator is being used to control the fuel flow of a gas turbine, to flow through the rotor cavity without the use of filters. Further, the unit is very reliable because it does not require brushes, slip rings, commutators, springs, anti friction bearings or brakes on the actuator unit. Some of these elements are required if a dynamic control mechanism of the type described is used but, since the actuator can be electrically controlled from a remote location, the control mechanism can be placed in a favorable environment.

Since the actuator operates at relative high torque, it has a long life, high reliability and is free from interference due to contaminated fuel. If the actuator is to be used in a high temperature environment, the actuator can be wound with magnet wire and insulated and impregnated with inorganic materials.

It will be apparent that modifications and variations may be effected without departing from the novel concepts of the present invention, and it will be understood that this application is to be limited only by the scope of the appended claims.

We claim as our invention:

1. An actuator comprising a rotor having a plurality of first poles which are magnetized with opposite magnetic poles adjacent each other, a stator mounted adjacent said rotor with a plurality of poles facing said rotor poles, the distance between adjacent stator poles being substantially one half the distance between adjacent rotor poles, and a plurality of electrical windings inductively coupled to said stator poles, said plurality of electrical windings being separated into first, second, third and fourth coil groups, said first and third coil groups being connected in series and being oppositely wound and said second and fourth coil groups being connected in series and oppositely wound, and means for reversing the direction of current flow through said plurality of electrical windings, said current reversing means including a two segment commutator and means for rotating said commutator, and a plurality of brushes which are mounted in contact with said commutator and are electrically connected to said coil groups.

2. A rotary digital actuator comprising a rotor having at least first and second poles which are magnetized in a radial direction, a stator mounted adjacent said rotor and having at least first, second, third and fourth stator poles which are separated from said rotor poles by an air gap, a first coil group mounted around said first stator pole, a second coil group mounted around said second stator pole, a third coil group mounted around said third stator pole, and a fourth coil group mounted around said fourth stator pole, said first and third coil groups being connected in series and being oppositely wound, and said second and fourth coil groups being connected in series and being oppositely wound, and means coupled to said coil groups for reversing the direction of current flow through them, said current reversing means including a rotatably mounted two segment commutator, four brushes mounted adjacent said commutator and connected across said coil groups, means for rotating said commutator, and means for electrically energizing said two segments of said two segment commutator.

3. A rotary digital actuator comprising a first substantially cylindrical member having a plurality of radially outwardly extending prongs, said prongs being permanently radially magnetized with opposite magnetic poles appearing adjacent each other, a second substantially cylindrical member adapted to fit around said first member and having a plurality of inwardly radially extending prongs which face said prongs on said first member, said second member prongs being evenly divisible into groups of four, the number of said first member prongs being one half the number of said second number prongs and being spaced twice the distance apart, first, second, third and fourth coil groups, said first coil group being wound on the first prong in each of said groups of stator prongs, said second coil group being wound on the second prong in each of said groups of stator prongs, said third coil group being wound on the third prong in each of said groups of prongs, and said fourth coil group being wound on the fourth prong in each of said groups of prongs, said first and third coil groups being connected in series and oppositely wound, and said second and fourth coil groups being connected in series and oppositely wound, and means adapted to supply electrical energy to said coil groups and to reverse the direction of current flow through them, said last named means including a rotatably mounted two segment commutator, diametrically opposed first and second brushes mounted in contact with said commutator and connected across said first and third coil groups, diametrically opposed third and fourth brushes mounted in contact with said commutator and connected across said second and fourth coil groups, reversible means for rotating said commutator, and means for placing one of the segments of said two segment commutator at a higher electrical potential than the other of the segments.

4. In an actuator, first and second relatively rotatable members, said first member having first, second, third and fourth poles having center lines spaced a certain distance apart, said second pole being intermediate said first and third poles and said third pole being intermediate said second and fourth poles, said second member having a plurality of poles facing said poles of said first member and having center lines spaced upon a distance equal to twice said certain distance, means for developing opposite magnetic poles in adjacent poles of said second member, first, second, third and fourth windings on said first, second, third and fourth poles respectively, means connecting said first and third windings in series opposition to form a first circuit, means connecting said second and fourth windings in series opposition to form a second circuit, and means arranged for sequentially applying current in one direction through both said circuits, then applying current in said one direction through said first circuit while applying current in the opposite direction through said second circuit, then applying current in said opposite direction through both circuits and then applying current in said opposite direction through said first circuit while applying current in said same direction through said first circuit, to thereby produce relative rotation of said members in one direction.

5. In an actuator, first and second relatively rotatable members, said first member having a plurality of groups of poles each group including first, second, third and fourth poles having center lines spaced a certain distance apart, said second pole being intermediate said first and third poles of the same group and said fourth pole being intermediate said third pole of the same group and a first pole of another group, said second member having a plurality of poles facing said poles of said first member and having center lines spaced upon a distance equal to twice said certain distance, means for developing opposite magnetic poles in adjacent poles of said second member, first, second, third and fourth windings for each group of poles on said first, second, third and fourth poles thereof respectively, means connecting said first windings together and in series opposition to said third windings to form a first circuit, means connecting said second windings together and in series opposition to said fourth windings to form a second circuit, and means to thereby produce relative rotation of said members in one direction.

6. In an actuator, first and second relatively rotatable members, said first member having first, second, third and fourth poles having center lines spaced a certain distance apart, said second pole being intermediate said first and third poles and said third pole being intermediate said second and fourth poles, said second member having a plurality of poles facing said poles of said first member and having center lines spaced upon a distance equal to twice said certain distance, means for developing opposite magnetic poles in adjacent poles of said second member, first, second, third and fourth windings on said first, second, third and fourth poles respectively, means connecting said first and third windings in series opposition to form a first circuit, means connecting said second and fourth windings in series opposition to form a second circuit, and selectively operable means having first and second conditions of operation, said means in said first condition of operation being arranged for sequentially applying current in one direction through both said circuits, then applying current in said direction through said first circuit while applying current in the opposite direction through said second circuit, then applying current in said opposite direction through both circuits and then applying current in said opposite direction to said first circuit while applying current in said same direction through said first circuit to thereby produce relative rotation of said members in one direction, and said means in said second condition of operation being arranged for sequentially applying current in one direction through both of said circuits, then applying current in the opposite direction through said first circuit while applying current in said one direction through said second circuit, then applying current in said opposite direction through both circuits and then applying current in said one direction through said first circuit while applying current in said opposite direction through said second circuit, to thereby produce relative rotation of said members in a reverse direction.

7. In an actuator, first and second relatively rotatable members, said first member having first, second, third and fourth poles having center lines spaced a certain distance apart, said second pole being intermediate said first and third poles and said third pole being intermediate said second and fourth poles, said second member having a plurality of poles facing said poles of said first member and having center lines spaced upon a distance equal to twice said certain distance, means for developing opposite magnetic poles in adjacent poles of said second member, first, second, third and fourth poles respectively, means connecting said first and third windings in series opposition to form a first circuit, means connecting said second and fourth windings in series opposition to form a second circuit, and means arranged for connection to a D.C. source and including commutator means, and means independent of said members for operating said commutator means at a desired rate.

8. In an actuator, first and second relatively rotatable members, said first member having first, second, third and fourth poles having center lines spaced a certain distance apart, said second pole being intermediate said first and third poles and said third pole being intermediate said second and fourth poles, said second member having a plurality of poles facing said poles of said first member and having center lines spaced upon a distance equal to twice said certain distance, means for developing opposite magnetic poles in adjacent poles of said second member, first, second, third and fourth windings on said first, second, third and fourth poles respectively, means connecting said first and third windings in series opposition to form a first circuit, means connecting said second and fourth windings in series opposition to form a second circuit, rectifier means for connection to an A.C. source and having a D.C. output, and means connected to said D.C. output and including commutator means for, and an A.C. motor for operating said commutator means.

References Cited in the file of this patent

UNITED STATES PATENTS

| | | |
|---|---|---|
| 697,763 | Apple | Apr. 22, 1902 |
| 2,432,117 | Morton | Dec. 9, 1947 |

FOREIGN PATENTS

| | | |
|---|---|---|
| 682,588 | Great Britain | Nov. 12, 1952 |